(12) United States Patent
Spinnler et al.

(10) Patent No.: US 12,384,204 B2
(45) Date of Patent: Aug. 12, 2025

(54) TIRE TREAD FOR A HEAVY-DUTY VEHICLE OF CONSTRUCTION PLANT TYPE

(71) Applicant: COMPAGNIE GENERALE DES ETABLISSEMENTS MICHELIN, Clermont-Ferrand (FR)

(72) Inventors: Olivier Spinnler, Clermont-Ferrand (FR); Alvaro Villa-Recio, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 675 days.

(21) Appl. No.: 17/608,863

(22) PCT Filed: Apr. 29, 2020

(86) PCT No.: PCT/EP2020/061860
§ 371 (c)(1),
(2) Date: Nov. 4, 2021

(87) PCT Pub. No.: WO2020/229176
PCT Pub. Date: Nov. 19, 2020

(65) Prior Publication Data
US 2022/0314703 A1    Oct. 6, 2022

(30) Foreign Application Priority Data
May 16, 2019 (FR) ..................... 1905097

(51) Int. Cl.
*B60C 11/12* (2006.01)

(52) U.S. Cl.
CPC ...... *B60C 11/1281* (2013.01); *B60C 11/1218* (2013.01); *B60C 2011/1268* (2013.01); *B60C 2200/065* (2013.01)

(58) Field of Classification Search
CPC ............. B60C 11/1281; B60C 11/1272; B60C 11/1218; B60C 2011/1268; B60C 2200/065; B60C 2200/06
See application file for complete search history.

(56) References Cited

U.S. PATENT DOCUMENTS

| | | | |
|---|---|---|---|
| 11,548,320 B2 | 1/2023 | Barbarin et al. | |
| 2011/0162770 A1* | 7/2011 | Yamakawa | B60C 11/0306 152/209.18 |

(Continued)

FOREIGN PATENT DOCUMENTS

| | | | |
|---|---|---|---|
| CN | 108367624 | 8/2018 | |
| EP | 0540340 A2 * | 5/1993 | ......... B60C 11/1281 |

(Continued)

*Primary Examiner* — Justin R Fischer
*Assistant Examiner* — Philip N Schwartz
(74) *Attorney, Agent, or Firm* — COZEN O'CONNOR (57) ABSTRACT

A tire tread for a heavy-duty vehicle of construction plant type and aims to reduce the risk of cracking at the sipe bottom, without significantly reducing the volume of material of the tread so as not to shorten the lifetime of the tire in respect of wear. The tread (I) has transverse sipes (5) having a depth H and a width E, each transverse sipe (5) having a radially inner end formed by a bulge (53) having an end radius R, the transverse sipes (5) being distributed longitudinally at a longitudinal spacing B, the depth H, the width E of each transverse sipe (5), the end radius R of the bulge (53) and the longitudinal spacing B satisfying the relationship $(R*B)/(E*H) \geq 1.8$.

14 Claims, 4 Drawing Sheets

(56) References Cited

U.S. PATENT DOCUMENTS

2018/0162166 A1\* 6/2018 Hiraishi ................ B60C 11/124
2018/0354310 A1\* 12/2018 Barbarin ............. B60C 11/1259

FOREIGN PATENT DOCUMENTS

| EP | 2492117 | 8/2012 | |
|---|---|---|---|
| EP | 2 736 735 | 6/2014 | |
| EP | 3 160 773 | 5/2017 | |
| FR | 3 058 927 | 5/2018 | |
| JP | H02179509 A \* | 7/1990 | ..... B60C 2011/1268 |
| JP | H06143943 | 5/1994 | |
| JP | H07172111 A \* | 7/1995 | ......... B60C 11/1281 |
| WO | WO2017/162953 | 9/2017 | |
| WO | WO 2018/096257 | 5/2018 | |
| WO | WO-2018096257 A1 \* | 5/2018 | ............. B60C 11/04 |

\* cited by examiner

TIRE TREAD FOR A HEAVY-DUTY VEHICLE OF CONSTRUCTION PLANT TYPE

RELATED APPLICATIONS

This is a U.S. National Phase Application under 35 USC 371 of International Application PCT/EP2020/061860 filed on Apr. 29, 2020.

This application claims the priority of French application no. FR 1905097 filed May 16, 2019, the entire content of all of which is hereby incorporated by reference.

FIELD OF THE INVENTION

The subject of the present invention is a tire tread for a heavy-duty vehicle of construction plant type intended to carry heavy loads and to run on uneven and rough ground such as that of mines, for example.

BACKGROUND OF THE INVENTION

A tread comprising at least one rubber-based material is intended to form the peripheral part of the tire and to be worn away as it comes into contact with the ground via a tread surface.

A tread can be defined geometrically by a mean surface and three dimensions: a dimension perpendicular to the mean surface, known as the thickness, a smaller dimension along the mean surface, known as the width, and a larger dimension along the mean surface, known as the length.

In the present document:
- a radial direction means a direction into the thickness of the tread, perpendicular to its mean surface, corresponding to a direction perpendicular to the axis of rotation of the tire;
- a transverse direction means a direction across the width of the tread, corresponding to the direction parallel to the axis of rotation of the tire;
- a longitudinal direction means a direction along the length of the tread, corresponding to a circumferential direction tangent to the periphery of the tire and perpendicular to the respectively radial and transverse directions;
- a longitudinal median plane means a plane containing the radial direction and the longitudinal direction, perpendicular to the mean surface and dividing the tread width-wise into two equal portions.

To ensure satisfactory performance in terms of longitudinal grip, under engine torque and under braking torque, and in terms of transverse grip, it is necessary to form, in the tread, a tread pattern that is a system of cuts separating elements in relief.

A cut is a space which is delimited by facing walls of material that are spaced apart from one another by a distance defining the width E of the cut, and extends from the tread, in the radial direction, to a depth H. Depending on the value of its width E, a cut is either a sipe or a groove. In the case of a sipe, this width E is appropriate to allow the opposing walls delimiting said sipe to come into at least partial contact at least while the tread is in contact with the ground, when the tire is subject to nominal load and pressure conditions recommended, for example, by the E.T.R.T.O. (European Tire and Rim Technical Organization) standard. In the case of a groove, the walls of this groove do not generally come into contact with one another under recommended nominal running conditions.

The cuts delimit elements in relief of the block type or of the rib type. A block comprises a contact face, contained in the tread, and at least three lateral faces, intersecting the tread surface. A rib comprises a contact face and two lateral faces extending, in the longitudinal direction, along the entire length of the tread. A rib is thus delimited, in the transverse direction, by one or two longitudinal cuts also known as longitudinal furrows.

The tread thus generally comprises cuts distributed in the form of longitudinal furrows, transverse grooves and transverse sipes. A longitudinal furrow is a furrow of which the mean profile forms an angle at most equal to 45° with the longitudinal direction, that is to say a furrow of which the mean profile has a generally longitudinal direction with a mean inclination closer to the longitudinal direction than to the transverse direction. A transverse groove or a transvers sipe is a cut of which the mean profile forms an angle at least equal to 45° with the longitudinal direction, that is to say a cut of which the mean profile has a generally transverse direction with a mean inclination closer to the transverse direction than to the longitudinal direction. Thus, a cut or a transverse sipe can be strictly transverse, with a mean profile forming an angle equal to 90° with the longitudinal direction, or strictly oblique, with a mean profile forming an angle strictly less than 90° with the longitudinal direction.

The tread, integrated into the tire, is usually characterized geometrically by a transverse width $W_T$, in the transverse direction, and a radial thickness $H_T$, in a radial direction. The transverse width $W_T$ is defined as the transverse width of the tread surface which is the contact surface of the tread of the new tire with smooth ground, the tire being subjected to recommended pressure and load conditions. The radial thickness $H_T$ is defined, by convention, as being the maximum radial depth measured in the cuts, usually in the longitudinal furrows. In the case of a tire for a heavy-duty vehicle of construction plant type, and by way of example, the transverse width $W_T$ is at least equal to 600 mm and the radial thickness $H_T$ is at least equal to 60 mm, or even 70 mm.

The normal running conditions, in terms of pressure, load and speed, of a tire for a heavy-duty vehicle of construction plant type, such as, for example, a dumper intended to transport materials extracted from quarries or surface mines, are particularly harsh. By way of example, on sites for extraction of materials, such as minerals or coal, the use of a vehicle of the dumper type consists, in a simplified manner, of an alternation of laden outbound cycles and empty return cycles. During a laden outbound cycle, the laden vehicle transports, mainly uphill, the materials extracted from the loading zones at the bottom of the mine, or bottom of the pit, as far as unloading zones: this requires good grip under traction of the tires. During an empty return cycle, the empty vehicle returns, mainly downhill, to the loading zones at the bottom of the mine: this requires good grip under braking of the tires. The usually sloping tracks are also often bendy, requiring good transverse grip of the tires. Moreover, the tracks along which the vehicles travel are made of materials taken from the mine, for example compacted crushed rocks which are regularly damped down in order to ensure the integrity of the wearing layer of the track as the vehicles pass along it, and are often covered in mud and water: this requires evacuation of this mixture of mud and water by the tread in order to ensure satisfactory grip on muddy ground.

In order to take the above-described use constraints into account, the document EP 2736735 proposed a tread for a construction plant tire comprising a central part with a width of between 40% and 60% of the total width of the tread, and edge parts on either side of this central part. The central part is provided with a plurality of sipes oriented generally transversely that are able to close when in the contact patch. Each edge part comprises a plurality of grooves oriented generally transversely that delimit a plurality of elements in relief, the number of elements in relief of each edge part being equal to the number of elements of relief of the central part, this number of elements being at least equal to 39 and at most equal to 49. This tread has an overall voids ratio or volumetric voids ratio at most equal to 20%, the volumetric voids ratio being defined as the ratio between the total volume of the cuts, measured on the free tire, that is to say when it is not mounted and not inflated, and the sum of the total volume of the cuts and of the total volume of the elements in relief delimited by these cuts. In summary, that document describes mainly a tread having transverse sipes contained in a central part.

To further improve the wear-related performance while maintaining appropriate grip, regardless of the state of wear of the tread, the document EP 3160773 describes a tread for a construction plant tire, said tread being provided with at least two cuts that are oriented generally circumferentially and have a mean depth at least equal to 70 mm and at most equal to the thickness of material to be worn away. These circumferential cuts divide the tread into a median portion having an axial width at least equal to 50% and at most equal to 80% of the total width of the tread, and into shoulder regions that axially delimit the tread. The median region comprises a plurality of transverse or oblique sipes that open into the circumferential cuts, these transverse or oblique sipes closing at least partially when in the contact patch and having a depth at least equal to 75% of the depth of the circumferential cuts. These transverse or oblique sipes delimit a plurality of material elements having a height equal to the mean depth H of said sipes and having a circumferential width B equal to the mean distance between two transverse or oblique sipes. This tread is such that, for all of the material elements delimited by two consecutive sipes in the median region, the ratio H/B is greater than 0.5 and at most equal to 2.5. Thus, that document describes a tread having a high density of transverse sipes.

Lastly, the document WO 2017162953 describes a tread for an off-road vehicle tire, having a total width greater than 600 mm. This tread is provided with at least three main grooves that are oriented generally circumferentially and having a depth at least equal to 60 mm, dividing the tread into intermediate ribs and edge ribs. The edge ribs have a width at most equal to a quarter of the total width of the tread, and at least a part of the intermediate ribs is provided with a plurality of narrow grooves having a depth H1, delimiting blades of material that have a mean width B1 less than twice the depth H1 and are oriented in the transverse direction. This tread is such that each intermediate rib has a mean width that is at most equal to a quarter of the total width and is at least equal to 0.75 times the thickness of material to be worn away, and is such that the narrow grooves have, over a height at least equal to 65% of their total depth H1, a width that is at most equal to the value obtained from the following mathematical expression: $0.04\sqrt{(B1.H1)}$. That document describes, more precisely, a siped tread having optimized sipe features.

For a tire which is mounted on a driven axle of a construction plant vehicle, subjected to engine or braking torque, and which comprises a tread comprising transverse sipes, the appearance of cracks is frequently found at the bottom of sipes, these cracks being able to cause total or partial chunking of the elements in relief.

SUMMARY OF THE INVENTION

The inventors have set themselves an objective of reducing the risk of cracking at the bottom of sipes, without significantly reducing the volume of material of the tread so as not to shorten the lifetime of the tire in respect of wear.

This objective has been achieved by a tire tread for a heavy-duty vehicle of construction plant type, said tread being intended to come into contact with the ground via a tread surface, having a radial thickness $H_T$ at least equal to 60 mm and comprising cuts delimiting elements in relief,
 the cuts being, in a longitudinal direction, longitudinal furrows, or, in a transverse direction, transverse grooves or transverse sipes,
 each transverse sipe being delimited by two walls intended to come into contact with one another when the tread surface comes into contact with the ground as the tire runs along,
 each transverse sipe having a depth H, measured radially towards the inside from the tread surface, at most equal to the radial thickness $H_T$, and a width E, measured perpendicularly to the two walls delimiting said transverse sipe and corresponding to the minimum distance between the two walls,
 each transverse sipe having a radially inner end made up of a bulge having an end radius R,
 the transverse sipes being distributed longitudinally at a longitudinal spacing B,
 the depth H, the width E of each transverse sipe, the end radius R of the bulge and the longitudinal spacing B satisfying the relationship $(R*B)/(E*H) >= 1.8$.

The criterion $(R*B)/(E*H)$ characterizing the invention may also be expressed in the form $(R/E)/(H/B)$, wherein, from a geometric point of view, the ratio R/E characterizes the resistance to cracking of the sipe and the ratio H/B characterizes the longitudinal flexibility of the element in relief with respect to shear. For a given transverse sipe width E, the greater the end radius R of the bulge, the more resistant the sipe is to cracking. For a given longitudinal spacing B of the distribution of the sipes, the greater the depth H of the sipe, that is to say the height of the element in relief, the more flexible the element in relief is. The criterion of the invention therefore expresses a relationship between the two descriptors R/E and H/B, which are characteristics respectively of the resistance to cracking of the sipe bottoms and of the shear deformation capability of the elements in relief delimited longitudinally by two sipes.

According to the invention, the radial thickness $H_T$ of the tread is at least equal to 60 mm. The thicker the tread, the more it effectively protects the crown reinforcement of the tire against mechanical attack.

Also advantageously, the width E of each transverse sipe is at least equal to 1 mm and at most equal to 20% of the radial thickness $H_T$. Below a sipe width E equal to 1 mm, the elements in relief adjacent to the sipe may no longer deform locally under the action of an indenter of the tread, this being likely to exacerbate local wear. Above a sipe width E equal to 20% of the radial thickness $H_T$ of the tread, the walls of the sipe may no longer come into contact with one another when the tread surface is in the contact patch, and therefore may no longer ensure the desired stiffness for limiting wear at the start and end of the contact patch.

Preferably, the end radius R of the bulge is at least equal to 2 times the width E of the transverse sipe. The greater the radius R/E, the better the resistance of the bottom of the sipe to cracking.

According to one advantageous embodiment of the sipe bottom, each bulge is a cylinder of radius R. Specifically, the cylinder allows an optimum compromise between the volume of the bulge and the change in the radius of curvature along the bulge.

In one advantageous manner of distribution, the transverse sipes are distributed longitudinally at a spacing B such that their depth H is at least equal to 0.5 times the spacing B, preferably at least equal to the spacing B. The greater the longitudinal slenderness H/B of the element in relief, the more the wear is limited.

According to one particular embodiment, the depths H of two consecutive transverse sipes are different. By virtue of this variability in sipe depth, the cracks initiated at the bottom of two consecutive sipes propagate in different planes and do not meet. Thus, there cannot be a single cracking plane connecting the base of several consecutive elements in relief, thereby making it possible to avoid the chunking of these elements in relief. Consequently, this design makes it possible to make the tread more robust with respect to severe mechanical loading (passage of torque, running with drift thrust).

According to a variant of the particular preceding embodiment, the depth H alternately assumes two different values H1 and H2 for two consecutive transverse sipes.

In a first sipe configuration, each transverse sipe has an undulating mean surface in a radial direction and/or in the transverse direction. An undulating mean surface of the transverse sipe allows shear blocking of the walls of the sipe, thereby increasing the stiffnesses of the elements in relief adjacent to the sipe and reducing the slip thereof on the ground, thereby limiting wear.

With all of the cuts having a total volume Vc and all of the bulges of the transverse sipes having a total volume $V_I$, the total volume $V_I$ of the bulges of the transverse sipes is advantageously at most equal to 10% of the total volume Vc of the cuts. This condition makes it possible to limit the impact of the presence of said bulges on the volume of rubber to be worn away, thereby ensuring a satisfactory lifetime with respect to wear.

Advantageously, the tread comprises at least two longitudinal furrows. The presence of these longitudinal furrows allows ventilation of the tread and, consequently, better control of its thermal behaviour.

A further subject of the invention is a tire for a heavy-duty vehicle of construction plant type comprising a tread according to any one of the above-described embodiments. The features of the transverse sipes H, E, R and B of the tread are measured on a tire in the free state, that is to say when it is not mounted on its rim and inflated.

BRIEF DESCRIPTION OF THE DRAWINGS

The features of the invention are illustrated in the schematic FIGS. 1 to 8, which are not shown to scale.

DETAILED DESCRIPTION OF THE DRAWINGS

Figure 1:
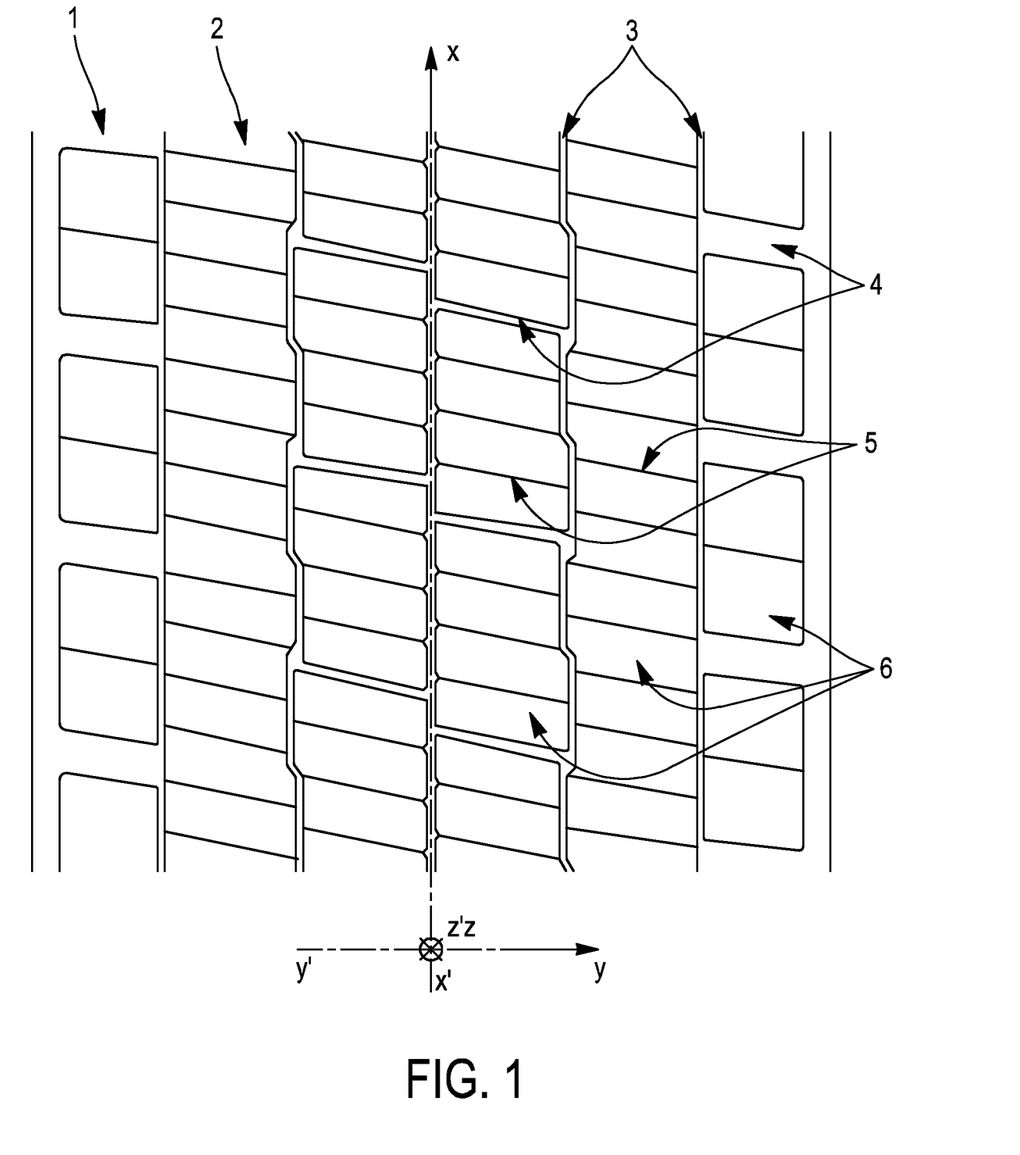
FIG. 1: Top view of a tread according to the invention.

FIG. 1 is a top view of a tread according to the invention. The tread 1, which is intended to come into contact with the ground via a tread surface 2, comprises cuts (3, 4, 5) delimiting elements in relief 6. The cuts (3, 4, 5) are longitudinal furrows 3 in a longitudinal direction XX', or transverse grooves 4 or transverse sipes 5 in a transverse direction YY'.

Figure 2:
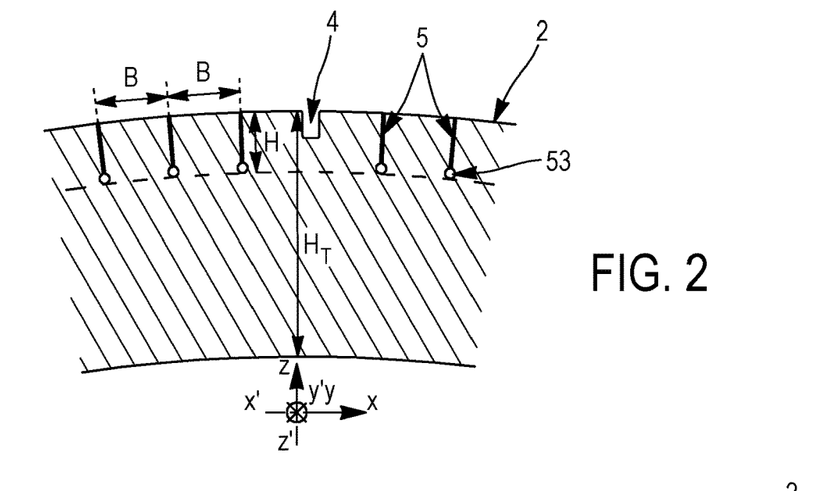
FIG. 2: View in cross section, on a longitudinal plane, of a tread according to the invention.

FIG. 2 is a view in cross section, on a longitudinal plane XZ, of a tread according to the invention. In the tread, which has a radial thickness $H_T$ at least equal to 60 mm, each transverse sipe 5 has a depth H, measured radially towards the inside from the tread surface 2, at most equal to the radial thickness $H_T$, and comprises a radially inner end made up of a bulge 53. The transverse sipes 5 are distributed longitudinally at a longitudinal spacing B. In the example shown, the tread also comprises, periodically, a transverse groove 4 positioned longitudinally between two transverse sipes 5, thereby locally creating a greater spacing between the two transverse sipes in question.

Figure 3:
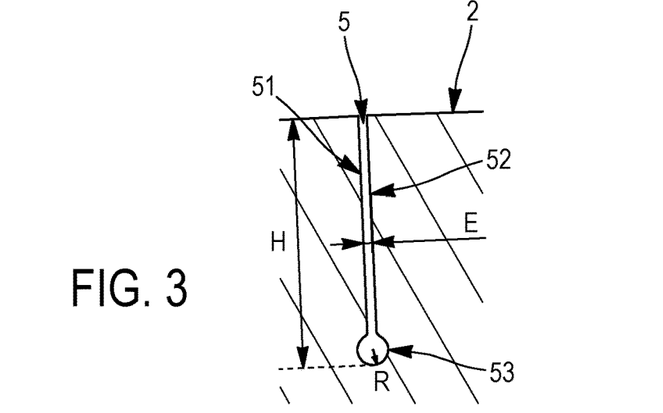
FIG. 3: Detail view in cross section, on a longitudinal plane, of a transverse sipe with a bulge at the sipe bottom.

FIG. 3 is a detail view in cross section, on a longitudinal plane, of a transverse sipe having a bulge at the sipe bottom. The transverse sipe 5 has a depth H, measured radially towards the inside from the tread surface 2, at most equal to the radial thickness $H_T$, and a width E, measured perpendicularly to the two walls (51, 52) delimiting said transverse sipe 5 and corresponding to the minimum distance between the two walls. Moreover, it has a radially inner end made up of a bulge 53 having an end radius R.

Figure 4:
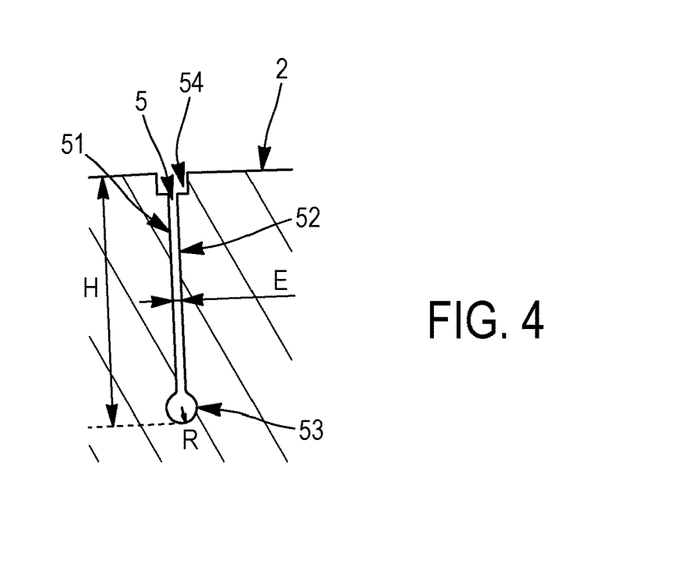
FIG. 4: Detail view in cross section, on a longitudinal plane, of a transverse sipe having a bulge at the sipe bottom and surface widening.

FIG. 4 is a detail view in cross section, on a longitudinal plane XZ, of a transverse sipe having a bulge at the sipe bottom and a surface widening. It differs from FIG. 3 by the presence of a widening 54 of the sipe at the tread surface 2, over a limited radial height. The thickness E of the sipe is not measured at the widening, at the radially outer end, or at the bulge, at the radially inner end: it is measured in the main portion of the sipe.

Figure 5:
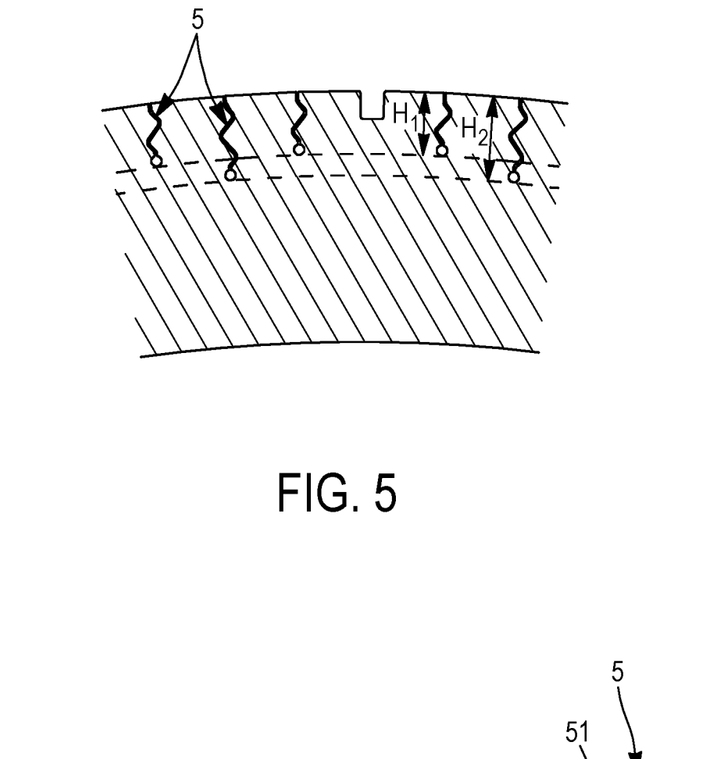
FIG. 5: View in cross section, on a longitudinal plane, of a tread according to the invention comprising a succession of transverse sipes with alternating depths.
Figure 6:
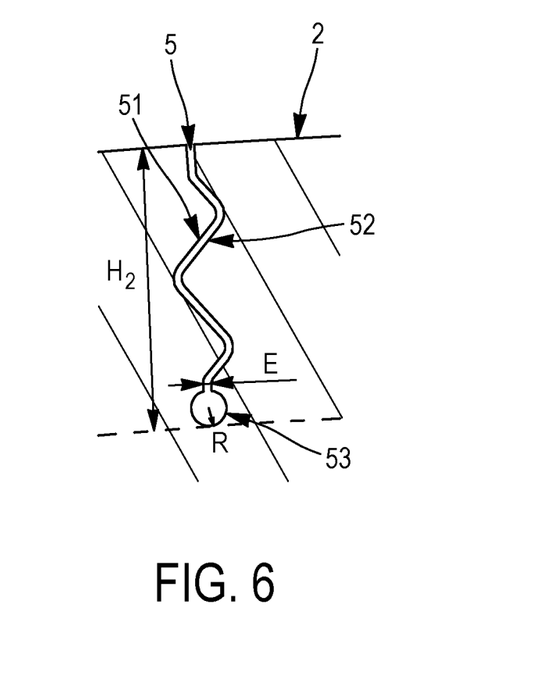
FIG. 6: Detail view in cross section, on a longitudinal plane, of an undulating transverse sipe.

FIG. 5 is a view in cross section, on a longitudinal plane XZ, of a tread according to the invention comprising a succession of transverse sipes with alternating depths. In the embodiment shown, the depths H of two consecutive transverse sipes 5 are different. More specifically, the depth H alternately assumes two different values H1 and H2 for two consecutive transverse sipes 5. Moreover, each transverse sipe 5 has an undulating mean surface in a radial direction ZZ'. FIG. 6 is a detail view in cross section, on a longitudinal plane XZ, of an undulating transverse sipe.

Figure 7:
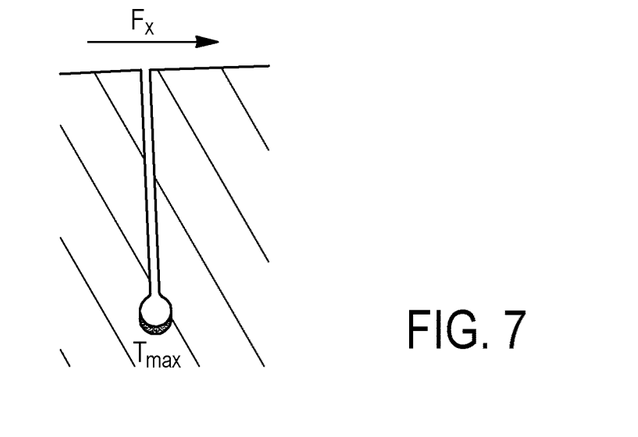
FIG. 7: Mechanical operating principle of a transverse sipe, under the action of shear loading.

FIG. 7 illustrates the mechanical operating principle of a transverse sipe, under the action of a shear load. When running, the ground exerts a longitudinal shear load $F_x$ on the tread at the tread surface, which generates, at the bottom of the radially inner bulge of the sipe, a stress concentration characterized by a maximum shear $T_{max}$.

Figure 8:
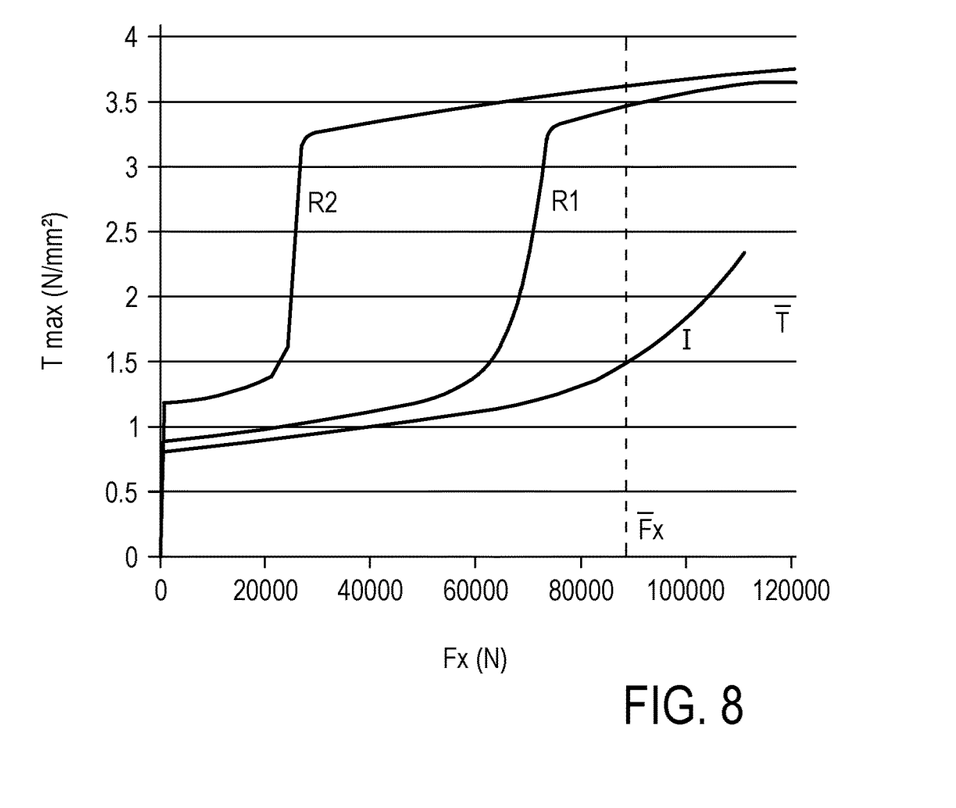
FIG. 8: Curves representing the maximum shear (or stress slip) $T_{max}$ at the sipe bottom as a function of the tensile load $F_x$ to be transmitted by the tire.

FIG. 8 illustrates three curves representing the maximum shear (or shear slip) $T_{max}$, at the sipe bottom, as a function of the tensile load Fx to be transmitted by the tire, for two prior art treads R1 and R2 and for a tread I according to the invention. These three curves are discussed below in the description of the examples tested by the inventors.

The inventors studied this invention more particularly for a dumper tire of the size 40.00 R 57. A tread I according to the invention was compared with two prior art treads R1 and R2, these three treads all comprising transverse sipes.

The transverse sipes of each of these treads are characterized by their radial height H, their width E and by their end radius R. The treads R1 and R2 do not have a bulge at their radially inner end, the radius R characterizes the rounded portion of their radially inner end and is, consequently, equal to half the width E of the sipe. Since the tread I according to the invention has a bulge at its radially inner end, the radius R is that of said bulge, the diameter of which is, by definition, greater than the width E of the sipe. Moreover, these transverse sipes are distributed longitudinally at a longitudinal spacing B.

Table 1 below presents the characteristics H, E, R and B, and the resultant characteristic ratio (R*B)/(E*H):

TABLE 1

| Characteristics | H | E | R | B | (R*B)/(E*H) |
|---|---|---|---|---|---|
| R1 | 80 mm | 10 mm | 5 mm | 240 mm | 1.5 |
| R2 | 100 mm | 2 mm | 1 mm | 60 mm | 0.3 |
| I | 80 mm | 2 mm | 5 mm | 70 mm | 2.19 |

The transverse sipes of the treads R1 and R2 have a characteristic ratio (R*B)/(E*H) equal to 1.5 and to 0.3, respectively, i.e. less than 1.8. By contrast, the transverse sipes of the tread I have a characteristic ratio equal to 2.19, i.e. greater than 1.8, in accordance with the invention.

It should also be noted that, for the tread I, the total volume $V_I$ of bulges of the transverse sipes is equal to 6%, i.e. less than 10%, of the total volume Vc of the cuts: this implies that the presence of these sipe bottom bulges does not significantly reduce the volume of rubber to be worn away and therefore the lifetime in terms of wear.

The invention was tested for a dumper tire of the size 40.00 R 57, intended to carry a load equal to 588 600 N, for an inflation pressure equal to 6.5 bar, according to the ETRTO standard. A dumper usually comprises two tires on its front steered axle and four tires on its rear driven axle: the vehicle as a whole can therefore carry 6*588 600 N=3 531 600 N. Assuming there is a mean gradient equal to 10%, when used in a mine, the tensile load to be transmitted by the rear driven axle equipped with 4 wheels is equal to 0.1*3 531 600 N=353 160 N, or 353 160 N/4=88 290 N for each driven wheel.

Following simulations involving finite-element calculations, the inventors estimated that the risk of cracking at the transverse sipe bottom becomes high above a maximum shear $T_{max}$ equal to 2 N/mm². The curves in FIG. 8 show that, for the two prior art treads R1 and R2, the maximum shear $T_{max}$ increases rapidly and significantly above a tensile load value $F_x$ substantially equal to 20 000 N and 60 000 N, respectively, and reaches a value equal to 3.5 N/mm² when the tensile load $F_x$ reaches the value, estimated above, equal to 88 290 N. Consequently, for the prior art treads R1 and R2, at the level of the tensile load in question, the risk of cracking is high since the maximum shear is greater than 2 N/mm². By contrast, in the case of the tread I, for a tensile load equal to 88 290 N, the maximum shear $T_{max}$ at the sipe bulge bottom is equal to 1.5 N/mm², and therefore remains below 2 N/mm².

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread for a heavy-duty vehicle of construction plant type, said tread being intended to come into contact with the ground via a tread surface, having a radial thickness Hr at least equal to 60 mm and comprising cuts delimiting elements in relief,
    the cuts being, in a longitudinal direction (XX'), longitudinal furrows, or, in a transverse direction (YY'), transverse grooves or transverse sipes,
    wherein at least one longitudinal furrow that delimits the elements in relief is a zig-zag in circumferential direction,
    each transverse sipe being delimited by two walls intended to come into contact with one another when the tread surface comes into contact with the ground as the tire runs along,
    each transverse sipe having a depth H, measured radially towards the inside from the tread surface, at most equal to the radial thickness HT, and a width E, measured perpendicularly to the two walls delimiting said transverse sipe and corresponding to the minimum distance between the two walls,
    each transverse sipe having a radially inner end made up of a circular bulge having an end radius R,
    for each group of the elements in relief separated by a pair of transverse grooves, the transverse sipes being distributed longitudinally at a longitudinal spacing B over the entire element in relief,
    wherein the depth H, the width E of each transverse sipe, the end radius R of the bulge and the longitudinal spacing B satisfy the relationship (R*B)/(E*H)>=1.8.

2. The tread according to claim 1, wherein the width E of each transverse sipe is at least equal to 1 mm and at most equal to 20% of the radial thickness HT.

3. The tread according to claim 1, wherein the end radius R of the bulge is at least equal to 2 times the width E of the transverse sipe.

4. The tread according to claim 1, wherein each bulge is a cylinder of radius R.

5. The tread according to claim 1, wherein the transverse sipes are distributed longitudinally at a spacing B such that their depth H is at least equal to 0.5 times the spacing B.

6. The tread according to claim 1, wherein the depths H of two consecutive transverse sipes are different.

7. The tread according to claim 6, wherein the depth H alternately assumes two different values H1 and H2 for two consecutive transverse sipes.

8. The tread according to claim 1, wherein each transverse sipe has an undulating mean surface in a radial direction (ZZ') and/or in the transverse direction (YY').

9. The tread according to claim 1, wherein all of the cuts have a total volume Vc and all of the bulges of the transverse sipes have a total volume VI, and wherein the total volume VI of the bulges of the transverse sipes is at most equal to 10% of the total volume Vc of the cuts.

10. The tread according to claim 1, wherein the tread comprises at least two longitudinal furrows.

11. A tire for a heavy-duty vehicle of construction plant type, comprising a tread according to claim 1.

12. The tread according to claim 5, wherein the transverse sipes have their depth H at least equal to the spacing B.

13. The tread according to claim 1, wherein at least one transverse sipe comprises a widening of the at least one transverse sipe at the tread surface over a limited radial height.

14. The tread according to claim 1, wherein the elements in relief proximate to an axial centerline are delimited by transverse grooves and the at least one zig-zag longitudinal furrow having first and second axial positions, the transverse sipes opening into the first and second axial positions.

* * * * *